United States Patent [19]

Heinze

[11] Patent Number: 5,333,392
[45] Date of Patent: Aug. 2, 1994

[54] PROCESS AND APPARATUS FOR THERMAL TREATMENT OF A MIXTURE OF SOLID SUBSTANCES AND GASES

[75] Inventor: Christoph Heinze, Burghausen, Fed. Rep. of Germany

[73] Assignee: Hoechst Aktiengesellschaft, Fed. Rep. of Germany

[21] Appl. No.: 994,203

[22] Filed: Dec. 21, 1992

[30] Foreign Application Priority Data

Dec. 24, 1991 [DE] Fed. Rep. of Germany ....... 4142926

[51] Int. Cl.⁵ ............................................. F26B 3/10
[52] U.S. Cl. ........................................ 34/363; 34/600
[58] Field of Search ................. 34/22, 57 A, 57 E, 10, 34/171, 226, 231; 432/14, 15, 58; 422/139; 110/245; 165/104.16

[56] References Cited

U.S. PATENT DOCUMENTS

| | | | |
|---|---|---|---|
| 2,100,907 | 11/1937 | McGehee et al. | 34/57 E |
| 2,363,281 | 11/1944 | Arnold | 34/57 E |
| 2,368,699 | 2/1945 | Arnold | 34/57 E |
| 2,924,887 | 2/1960 | Marshall, Jr. | 34/57 E |
| 3,518,778 | 7/1970 | Gresch | 34/57 R |
| 3,740,865 | 6/1973 | Laguilharre | 34/57 E |
| 4,089,119 | 5/1978 | Heinze | 34/10 |
| 5,042,169 | 8/1991 | Vero | 34/57 E |

FOREIGN PATENT DOCUMENTS

1129113 1/1957 Fed. Rep. of Germany .

*Primary Examiner*—Denise Gromada
*Attorney, Agent, or Firm*—Connolly & Hutz

[57] ABSTRACT

An apparatus known per se for the thermal treatment of a mixture of solids and gases, comprising a vessel having an axially symmetrical interior, which vessel has in the lower part and in the upper part in each case at least one tangentially arranged opening, in the interior of the vessel at least one annular baffle tightly sealing to the vessel wall being arranged between the two openings, and the lower part of the vessel having a smaller diameter, is operated or is designed so that in the lower part a high radial velocity and short residence time prevail and in the upper part a low radial velocity and long residence time prevail.

10 Claims, 3 Drawing Sheets

PROCESS AND APPARATUS FOR THERMAL TREATMENT OF A MIXTURE OF SOLID SUBSTANCES AND GASES

DESCRIPTION

U.S. Pat. No. 4,089,119 discloses a process for the thermal treatment of a mixture of solid substances and gases, the gas being introduced tangentially into the lower part of an axially symmetrical vessel, the solid substance being added at the latest to the gas after entry into the vessel, the mixture of solid and gas being heated by the vessel shell, the solid-containing gas stream being directed within the vessel from bottom to top in at least two substantially closed, horizontally stacked flow rings, the mass transport from one flow ring to the next flow ring above taking place in a concentric internal zone of the flow rings and the mixture being withdrawn in the upper part of the vessel. This process is only applicable to mixtures having fine particulate solid substances. If the solid contains individual relatively large particles, with the possibility of settling structure may be provided in the lower part where coarse components are ejected, possibly comminuted and returned. If the air classification action given by this process is to be further intensified, the solid is added above the gas entry at the level of the second, third or fourth flow ring.

In a particular embodiment of this process, an apparatus is used which comprises two stacked cylindrical vessel parts, the lower part having a narrower diameter. In this embodiment, the gas is introduced into the lower part and the solid is introduced at the lower end of the upper part.

In other embodiments, a single cylindrical vessel is charged at the bottom with the mixture of fine particulate solid and gas, where the solid can contain fractions which are composed of ejected coarse particles which were ground prior to their return.

It has now been found that this process is considerably improved if the mixture of gas and solid is introduced tangentially into the lower part of a cylindrical vessel, above which is arranged a second cylindrical vessel having a larger diameter. According to the invention, solids can be used here which contain coarse components, as far as these can be conveyed pneumatically. In addition, the invention is not restricted to the final drying of already predried (and, in addition, fine particulate) materials, but can also be used for example for drying wet polyvinyl chloride having coarse fractions, or also, for example, for drying polytetrafluoroethylene microfine powder slurry. Furthermore, according to the invention sesame seeds can be freed from their firmly adhering husk, without them sticking together or agglomerating.

BRIEF DESCRIPTION OF THE DRAWINGS

The invention can be implemented in various embodiments:

In principle, an apparatus according to FIG. 7 of U.S. Pat. No. 4,089,119 can be used, the solid/gas mixture being introduced via the feed (there: 19). In this case the feed (there: 3) can be dispensed with and eliminated from the variant, according to FIG. 1, used according to the invention.

Figure 2:
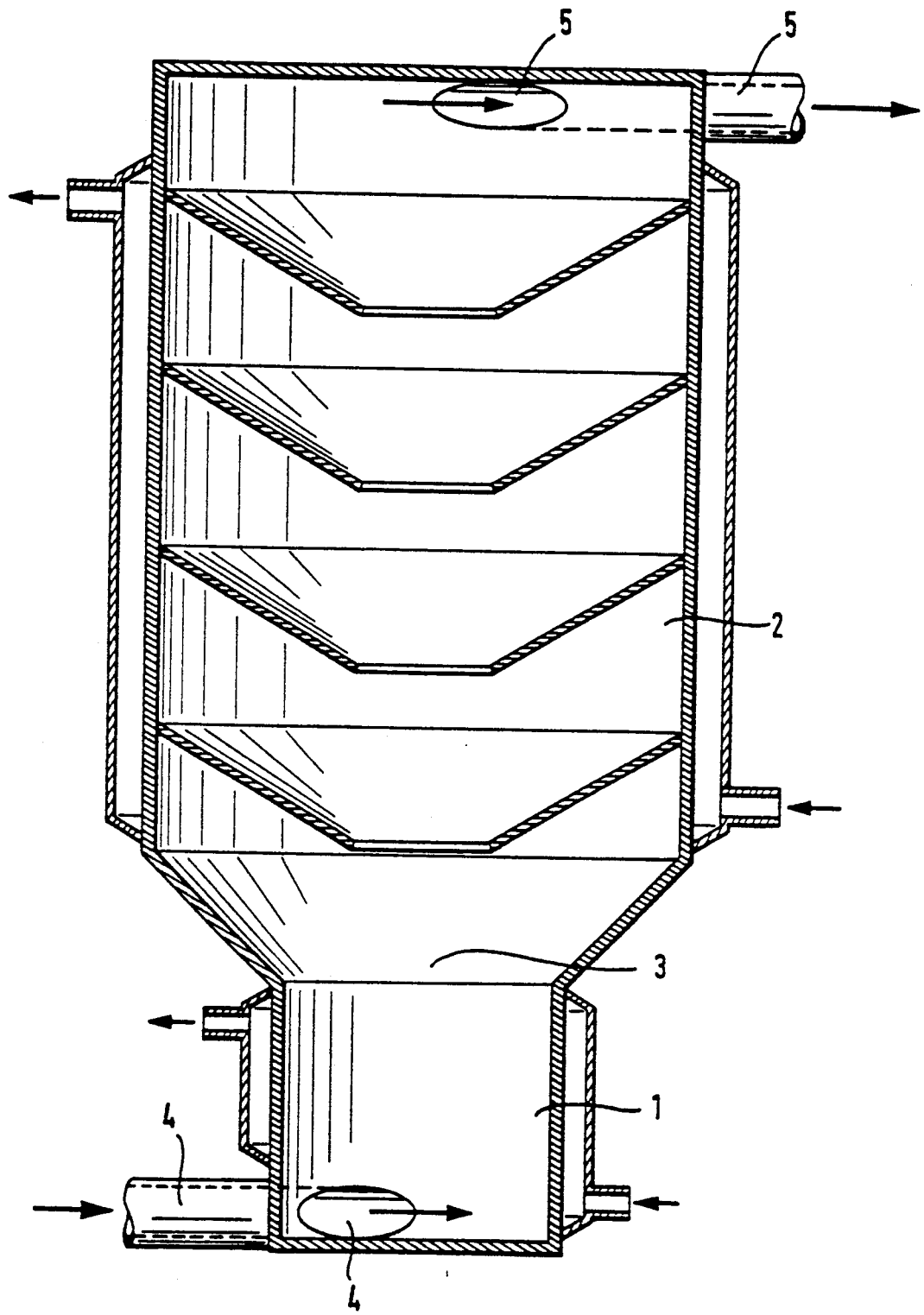

An analogous embodiment is also advantageous, in which annular baffles are arranged only in the upper vessel part ( FIG. 2 ).

Figure 3:
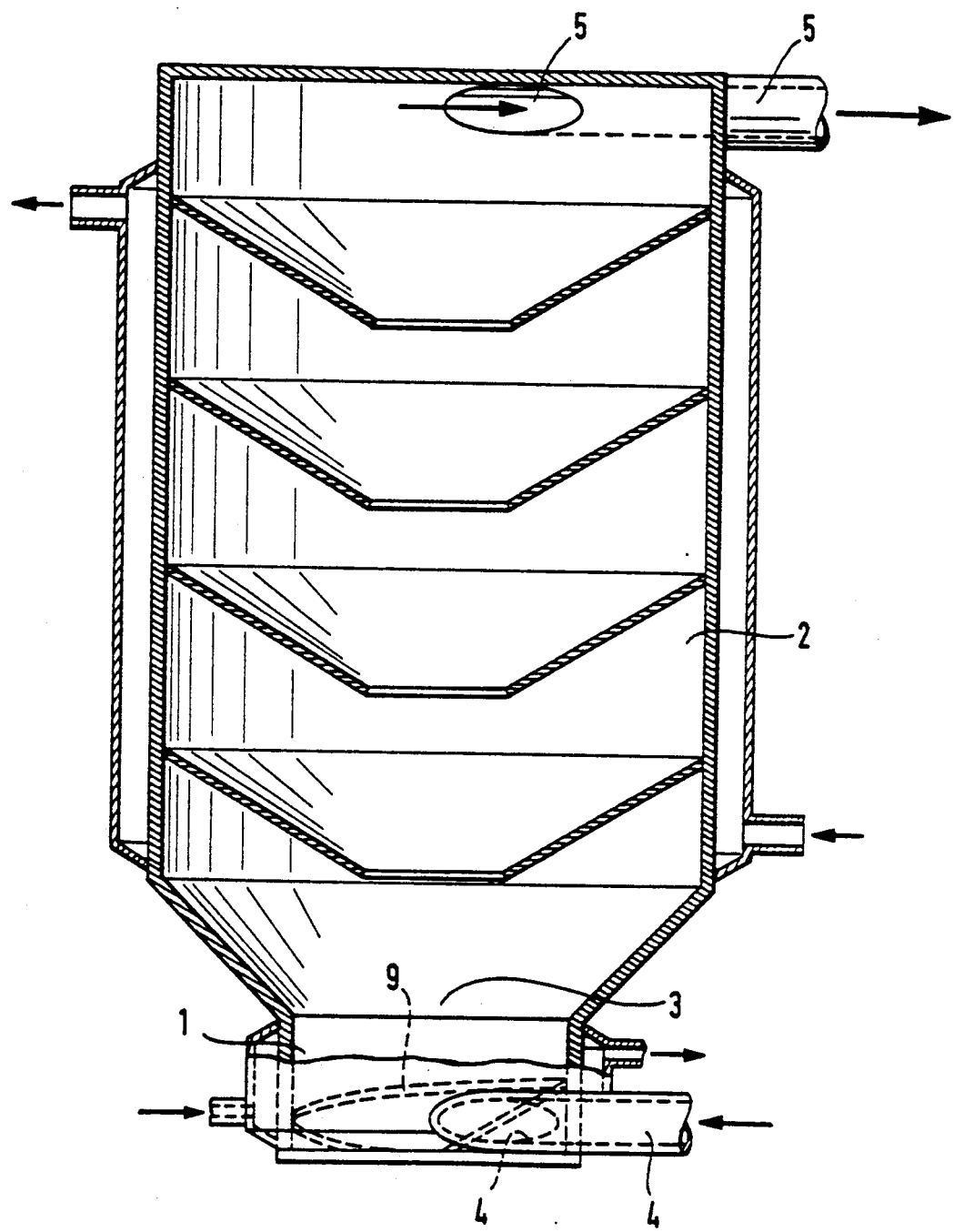

In a further advantageous embodiment, in the lower, narrower vessel part, the annular baffles are replaced by a spiral having a concentric internal zone (FIG. 3).

Appropriate further variants of the invention are possible for those skilled in the art on the basis of these embodiments and their expert knowledge.

The dimensioning of the lower, narrower vessel part (1) and the upper, wider part (2) is carried out according to the particular application and can be determined by simple preliminary tests. If, for example, a solid having a coarse fraction is to be dried, the residence time in part (1) is advantageously arranged so that the surface moisture is removed, whereupon in part (2), as a result of the correspondingly longer residence time, the subsurface moisture is removed. The residence time in part (1) is expediently adjusted in this process so that, on transfer into part (2) [point (3)], a flowable product is present.

Depending on the structure, the gas velocity at point (3) decreases abruptly. Clearly, however, it must remain high enough in part (2) to convey the solid and to discharge it in the desired condition at the upper end of part (2). Expedient variants of the invention which take these requirements into account are therefore, for example:

If, in particular, an aggregated, non-flowable wet material with a tendency to caking is to be dried according to the invention, a hot gas of high gas velocity is required for drying and for pneumatic transport, so that, for example, a product/gas flow rate of at least 20 m/s, advantageously 20 to 100 m/s and in particular 25 to 40 m/s results. The mixture of hot gas and wet material is blown at this high velocity tangentially into the inlet of part (1). The ratio of angular velocity $v_d$ to axial velocity $v_a$ is here at least 2, advantageously 2 to 10 and in particular 2.5 to 5. The parameters here are chosen so that the predried solid remains for only a few seconds in part (1), the evaporated surface moisture transferring to the hot gas, but the solid not being thermally stressed.

After the predrying in part (1), the mixture of hot gas, now charged with moisture, and the predried solid at point (3) enter at high angular velocity into part (2) which acts as a secondary drier. In order to ensure that in part (1) all solid particles pass into the axial flow directed upwards, in part (1) a high radial velocity is required which exerts a sweeping force. In part (2), in contrast, it is important that the radial velocity is reduced as a result of the larger diameter so that in the openings of the annular baffles the desired classification effect is achieved and/or the required residence time—corresponding to the secondary drying time required—is achieved.

The hot gas leaves part (1) with a lower temperature, as a result of the evaporated surface moisture, but the temperature still having to be high enough so that the desired secondary drying in part (2) is possible. The great advantage of the invention lies in the fact that the predrying and secondary drying are carried out using the same gas.

The invention is described more closely in the following examples, the dimensions of the apparatuses and the results being displayed in Table 1 to facilitate an overview. Percentages are by weight.

Example 1 (Conditioning of sesame seed)

Raw sesame seed is composed of up to about 80% of kernel and up to about 20% of husk. The two have hitherto been separated by means of flotation in salt water, whereupon a washing process and a drying step follow. This process is expensive, in particular the washing process, since sesame is principally produced and consumed in countries which have poor water resources. An end product is desired having as high as possible a residual moisture content of the kernel of 15 to 19% and a husk fraction of about 10%. According to the invention, such a product is obtained as follows:

The raw product is washed to remove dirt and "dead" seed and passes, at about 40% residual moisture, into a slow-running stirrer apparatus. The grain is "peeled" in this, that is the husk is loosened from the kernel by friction, but not separated.

Figure 1:
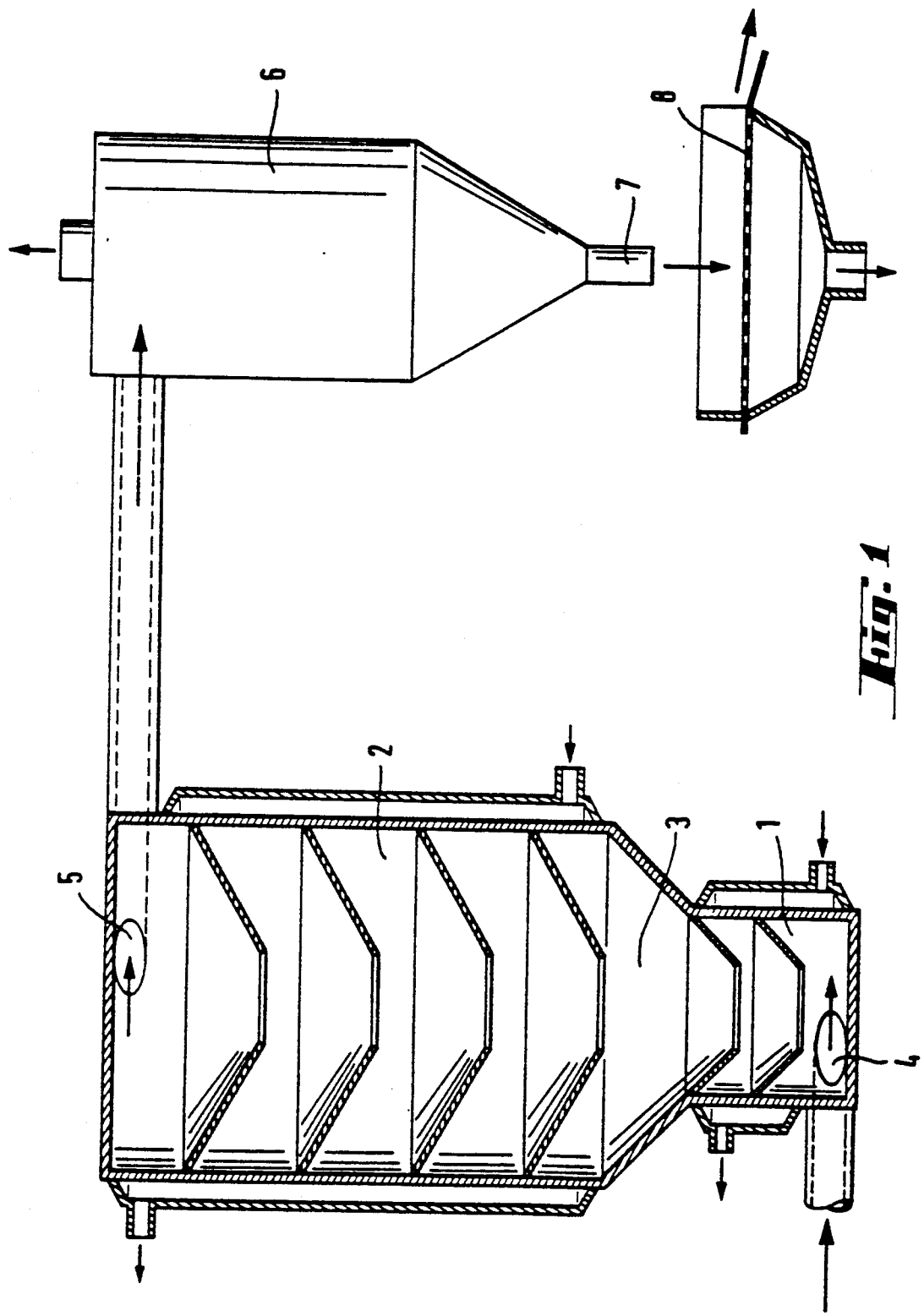

44 kg/h of this product are then vortexed in an apparatus according to FIG. 1 using 550 m³ (S.T.P.)/h at 114° C. and blown via the inlet (4) into part (1) at a velocity of 30 m/s. The ratio of the angular velocity $v_d$ to axial velocity $v_a$ is 2.5:1.

At the transfer point (3), the velocity of the product/air mixture decreases to 12 m/s and the air temperature decreases to 85° C. The product moisture is 25%.

In part (2) the residence time of the product is 500 times the predrying time in part (1). The air temperature, measured at the exit (5) of part (2), decreases to 70° C. and the product is transported at a residual moisture content of 19% into the cyclone (6). From the cyclone (6), the solid passes via the pipe (7) to the sieve (8) in which the separation into kernel and husk is carried out.

Comparison Example

In the attempt to condition the "peeled" product in an apparatus according to U.S. Pat. No. 4,089,119, FIG. 7, the air being introduced via the feed (there: 19) and the sesame grain via the feed (there: 3), a product is obtained having a residual moisture content of only 4%. Moreover, the husk has completely detached from the grain. Furthermore, aggregation occurs in part (1) of the apparatus.

Example 2

In an apparatus according to FIG. 2, a polytetrafluoroethylene micropowder wet cake having a moisture content of 50% (water and a small amount of hydrocarbons) and a particle size distribution of 20 μm to 10 cm is vortexed at a rate of 75 kg/h using 4000 m³ (S.T.P.) per hour of air at 250° C. and is introduced into part (1) via the inlet (4) at a velocity of 25 m/s. The ratio $v_d$:v, is 4.5:1.

The air temperature at point (3) has decreased to 175° C., the product/air mixture velocity is 5.5 m/s. The predried product contains only 7% residual moisture. In part (2) a 300-fold longer residence time is maintained and the product is discharged at outlet (5) at an air temperature of 150° C. The product has a residual moisture of below 0.01%.

Example 3

An aggregated polyvinyl chloride suspension having a particle size distribution of 20 μm to 10 cm and a water content of 30% is blown, using 50,000 m³ (S.T.P.) per hour of air at 170° C., at a velocity of 40 m/s via inlet (4) into part (1). The ratio $v_d$:v, is 5:1.

Via the spiral (9), the product/air mixture passes at point (3), at a velocity of 8 m/s, into part (2), the air temperature being 70° C. The product predried in this manner still contains 4% water.

In part (2), a residence time 600 times that of part (1) is maintained. The product is discharged at the discharge point (5) at an air temperature of 60° C. and at a residual moisture content of at most 0.2%.

Explanations to Table 1:

In the rows "moisture" and "temperature" the figures separated by oblique strokes denote the values measured in the inlet (4), at point (3) and in the outlet (5).

"$v_1$" denotes the velocity of the product/gas stream in the inlet (4) of part (1), "$(v_a)_2$" denotes the axial velocity at the inlet into part (2) [at point (3)]. "$t_{2/1}$" denotes the ratio of the residence times in parts (2) and (1).

TABLE 1

| | Examples | | |
|---|---|---|---|
| | 1 | 2 | 3 |
| Product: type | sesame | PTFE | S-PVC |
| Particle size | 1.2 to 2.0 mm | 20 μm to 10 cm | 20 μm to 10 cm |
| Rate, kg/h | 44 | 75 | 8,500 |
| Moisture, % | 40/25/19 | 50/7/<0.01 | 30/4/≦0.2 |
| Air: rate, m³ (S.T.P.)/h | 550 | 4,000 | 50,000 |
| Temperature, °C. | 114/85/70 | 250/175/150 | 170/70/60 |
| Mixture: $v_1$, m/s | 30 | 25 | 40 |
| $(V_d/v_a)_1$ | 2.5 | 4.5 | 5 |
| $(v_a)_2$, m/s | 12 | 5.5 | 8 |
| $t_{2/1}$ | 500 | 300 | 600 |
| Apparatus: Figure | 1 | 2 | 3 |
| ∅ (2):∅ (1) | 1.33 | 1.74 | 1.7 |
| Height (1):∅ (1) | 0.95 | 1 | 0.9 |

I claim:

1. A process for thermally treating a mixture of solids and gases comprising the steps of tangentially introducing gases into an axially symmetrical vessel at a lower part of the vessel, adding solids to the gases immediately after or before entry of the gases into the vessel to thereby form a mixture of solids and gases, heating the mixture of solids and gases by a heated shell surrounding the vessel, directing a stream of solids and gases within the vessel from bottom to top in at least two substantially closed horizontal stacked flow rings, transporting the stream of solid substances and gases from one flow ring to the next flow ring above in a concentric internal zone of the flow rings, withdrawing the mixture of solids and gases from an upper part of the vessel, and wherein the mixture of solids and gases is introduced as a pneumatically transportable mixture into a zone having high radial velocity and subsequently transporting the mixture into a zone having reduced radial velocity.

2. The process as claimed in claim 1, wherein the mixture of solids and gases is introduced at a velocity of at least 20 m/s.

3. The process as claimed in claim 1, wherein the mixture of solids and gases is introduced at a velocity of 20 to 100 m/s.

4. The process as claimed in claim 1, wherein the mixture of solids and gases is introduced at a velocity of 25 to 40 m/s.

5. The process as claimed in claim 1, wherein the mixture of solids and gases in the zone of high radial velocity has a ratio of angular velocity $v_d$ to axial velocity $v_a$ at least 2.

6. The process as claimed in claim 5, wherein the ratio is 2 to 10.

7. The process as claimed in claim 5, wherein the ratio is 2.5 to 5.

8. An apparatus for carrying out the process as claimed in claim 1, comprising a vessel having an axially symmetrical interior and an outer shell having heating devices at least over a portion thereof, the vessel having a lower narrower part and an upper wider part with at least one opening in each arranged tangentially to the shell, at least one annular baffle in the interior of the vessel tightly sealed to the vessel and arranged between the tangentially arranged openings, the lower part of the vessel having a smaller diameter than the upper part, and a common feed for gases and solids leading into the lower narrower part of the vessel.

9. The apparatus as claimed in claim 8, wherein only the upper wider part of the vessel contains the at least one annular baffle.

10. The apparatus as claimed in claim 8, wherein the lower narrower part of the vessel contains a spiral tightly sealed to the vessel, which improves transport of the gases and solids stream into the upper wider vessel part.

* * * * *